2,694,696
N,N-ETHYLENEUREIDOALKYL VINYL ETHERS

Sidney Melamed, Philadelphia, Pa., assignor to Rohm & Haas Company, Philadelphia, Pa., a corporation of Delaware No Drawing. Application April 10, 1953, Serial No. 348,106

10 Claims. (Cl. 260—77.5)

This invention relates to N,N-ethyleneureidoalkyl vinyl ethers of the structure

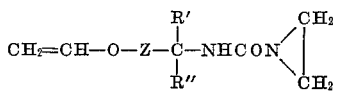

wherein Z is an alkylene group of one to seven carbon atoms, R' and R'' are alkyl groups when Z is a chain of not over two carbon atoms, and when Z is a chain of more than two carbon atoms, R' and R'' are hydrogen or alkyl groups. In the preferred compounds R' and R'' are alkyl groups of not over four carbon atoms each and are most commonly methyl groups. This invention further relates to a method for preparing these compounds and to polymers and copolymers therefrom.

The compounds of this invention react with wool and silk to impart permanent finishes thereto. The polymers and copolymers are useful in the fields of coatings, laminates, and textile finishes.

The ethyleneureidoalkyl vinyl ethers of this invention are prepared by reacting together between 0° and 100° C. an isocyanatoalkyl vinyl ether of the formula

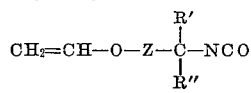

and ethyleneimine. The reaction is best effected in the presence of an inert organic solvent, such as naphtha, benzene, or toluene. Theoretically the reaction involves one mole of each compound, but exact proportions are not needed. Usually it is most convenient to use an excess of ethyleneimine and to remove the unreacted portion from the reaction mixture by heating under reduced pressure to leave a residue, which is the desired product.

Preparation of isocyanatoalkyl vinyl ethers is described in application Serial No. 348,107, filed on even date. An aminoalkyl vinyl ether is reacted with a halocarbonate XCOOR° to give an ester, such as an alkyl (N-vinyloxyalkyl)carbamate. The carbamate is decomposed when heated in the presence of a strong base, such as calcium oxide, sodium oxide, sodium hydroxide, or alkali metal alkoxides, to give the isocyanatoalkyl vinyl ethers used here as starting materials.

Typical isocyanatolalkyl vinyl ethers include 2-isocyanatoisobutyl vinyl ether, 2-isocyanato-2-methylbutyl vinyl ether, 2-isocyanato-2-methylhexyl vinyl ether, 2-isocyanato-2-ethylbutyl vinyl ether, 3-isocyanato-3-methylbutyl vinyl ether, 4-isocyanato-4-methyl-2-pentyl vinyl ether, 4-isocyanato-4-methyl-1-pentyl vinyl ether, 7-isocyanato-3,7-dimethyl-1-octyl vinyl ether, etc. Reaction of these compounds with ethyleneimine yields the corresponding N,N-ethyleneureidoalkyl vinyl ethers.

The products are polymerizable under the influence of azo free radical catalysts. From 0.05% to 2% of one or more of these catalysts is sufficient to promote polymerization at temperatures between 50°–90° C.

The azo catalysts are compounds in which the —N=N— group is attached to aliphatic carbon atoms, at least one of which is tertiary. In these, one of the carbon atoms bonded to the tertiary carbon atoms has its remaining valences satisfied by at least one element from the class consisting of oxygen and nitrogen. Typical catalysts are dimethyl, diethyl, or dibutyl azodiisobutyrate, azodiisobutyramide, azodiisobutyronitrile, azobis(α-methylbutyronitrile), azobis(α-methylvaleronitrile), dimethyl or diethyl azobismethylvalerate, and the like. Azo catalysts are also useful in preparing copolymers.

The N,N-ethyleneureidoalkyl vinyl ethers enter into copolymers with one or more other vinylidene compounds which are polymerizable with free radical catalysts. While polymerizable monovinylidene compounds are usually preferred, there may also be used polyvinylidene compounds, which cause cross-linking in the resulting copolymer. Useful free radical-polymerizable vinylidene compounds include esters of acrylic and methacrylic acids, acrylamides, methacrylamides, methacrylonitrile, acrylonitrile, styrene, vinyl esters, etc.

Copolymerization may be effected with the aid of one or more of the above azo catalysts under conditions described for polymerization. With a minor proportion of an ethyleneureidoalkyl vinyl ether in the mixture to be copolymerized there may effectively be used a peroxidic catalyst, such as benzoyl peroxide, caproyl peroxide, cumene peroxide, methyl ethyl ketone peroxide, tert.-butyl hydroperoxide, or butyl perbenzoate, or in aqueous systems a catalyst such as ammonium, sodium, or potassium persulfate.

In the following illustrative examples will be found further details of procedure as applied to reaction of typical starting materials resulting in typical products, which are readily polymerized and copolymerized. Parts are by weight.

Example 1

A solution is prepared from 13 parts of 2-isocyanatoisobutyl vinyl ether and 20 parts of benzene. A solution is also prepared from five parts of ethyleneimine and five parts of benzene. The two solutions are mixed. The mixture is evaporated under reduced pressure and the resulting residue is warmed at low pressure. There is obtained an oil which is mobile and slightly yellow. It contains by analysis 58.72% of carbon, 8.66% of hydrogen, and 15.03% of nitrogen, thus corresponding in composition to 2-N,N-ethyleneureidoisobutyl vinyl ether,

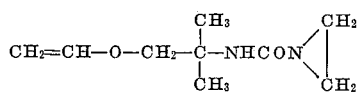

which has the following theoretical analysis: carbon 58.7%; hydrogen, 8.7%; and nitrogen, 15.2%. The yield is almost quantitative.

Example 2

(a) There are mixed 30 parts of N,N-ethyleneureidoisobutyl vinyl ether and 1.5 parts of dimethyl azodiisobutyrate. The reaction vessel is flushed with nitrogen and heated at 75° C. for 16 hours. A polymer insoluble in water results. The product contains by analysis 14.7% of nitrogen.

(b) A solution of 30 parts of ethyleneureidoisobutyl vinyl ether and 10 parts of dimethylformamide is heated with 0.7 part of dimethyl azodiisobutyrate and heated at 75° C. for 16 hours. The solvent is taken off by heating under reduced pressure. There results a viscous oil which is soluble in acetone or dimethylformamide, but insoluble in water. The product is a polymer. A portion thereof in dimethylformamide is heated with adipic acid and p-toluene sulfonic acid. An insoluble gel results.

Example 3

A mixture of two parts of N,N-ethyleneureidoisobutyl vinyl ether and ten parts of butyl acrylate is emulsified in 33 parts of water containing two parts of an octylphenoxypolyethoxyethanol emulsifier. The emulsion is treated with 0.12 part of ammonium persulfate and 0.21 part of sodium hydrosulfite. Heat of copolymerization raises the temperature of the mixture to 63° C. The resulting dispersion is useful for finishing textiles. In particular it is applied to wool cloth at 3.5% solids and with 1% oxalic acid. The cloth is then dried and cured at 270° F. for 10 minutes. The cloth becomes highly resistant to shrinking, even when washed for 300 minutes. Yet the wool retains a full, pleasant hand. Untreated controls gave a 40% to 60% shrinkage under the same conditions of washing.

*Example 4*

In accordance with the procedure of Example 1, there are brought together in benzene solution 16 parts of 4-isocyanato-4-methyl-2-pentyl vinyl ether and five parts of ethyleneimine. The solvent and excess imine are removed by heating on a steam bath under reduced pressure. A yellow oil remains which corresponds in composition to 4-N,N-ethyleneureido-4-methyl-2-pentyl vinyl ether.

When this compound is heated with dimethyl azodiisobutyrate at 95°—80° C. for 16 hours, a viscous resin is formed.

*Example 5*

In the same way there are reacted in toluene solution 21 parts of 7-isocyanato-3,7-dimethyloctyl vinyl ether and 5 parts of ethyleneimine. The product is obtained as a residue which corresponds in composition to the compound

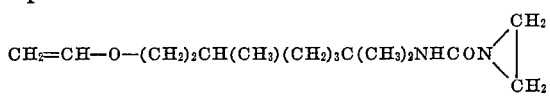

*Example 6*

(a) A solution is prepared from 150 parts of ethoxyethyl acetate, 10 parts of 2-N,N-ethyleneureidoisobutyl vinyl ether, 10 parts of methacrylic acid, and 80 parts of methyl methacrylate. To this solution is added two parts of azodiisobutyronitrile. The solution is blanketed with nitrogen and heated at 75° C. for six hours. There results a viscous solution of copolymer. Its viscosity is about Z on the Gardner-Holdt scale.

To this solution is added 1% of p-toluenesulfonic acid. The resulting solution is filmed on a metal plate and baked at 150° C. for 30 minutes. A hard, glossy film results which is resistant to conventional solvents.

(b) There are mixed 10 parts of the polymer obtained in Example 2 from N,N-ethyleneureidoisobutyl vinyl ether, 90 parts of a solution of the copolymer obtained from a mixture of 10 parts of acrylic acid and 90 parts of methyl methacrylate copolymerized in about 150 parts of ethoxyethyl acetate. The solution of the polymer and the defined copolymer is treated with one part of p-toluenesulfonic acid. Films are then formed on plates. These are cured at 150° C. for 30 minutes. Very hard, solvent-resistance films result.

(c) A copolymer is prepared from a mixture of 54 parts of methyl methacrylate, 9 parts of methacrylic acid, and 27 parts of butyl acrylate in ethoxyethyl acetate by copolymerizing with benzoyl peroxide in the usual way. To the solution of copolymer is added a polymer of N,N-ethyleneureidoisobutyl vinyl ether, prepared as in Example 2a, in an amount of 10 parts. The resulting mixture is acid catalyzed with p-toluenesulfonic acid and applied as films. The films are baked at 150° C. for 30 minutes. They become somewhat hard and very tough with marked resistance to organic solvents.

Similarly useful copolymers are obtained from the N,N-ethyleneureidoalkyl vinyl ethers and mixtures of arcylic acid and/or methacrylic acid and alkyl acrylates and/or methacrylates, the mixtures containing acid and ester in ratios from 1:49 to 1:4. The baked films from the resulting interpolymers or mixtures of polymers are generally hard, glossy, and resistant to solvents.

*Example 7*

There are mixed two parts of N,N-ethyleneureidoisobutyl vinyl ether, 18 parts of acrylonitrile, and 50 parts of dimethylformamide. Thereto is added methyl azodiisobutyrate in an amount of 0.5 part. The solution, after being blanketed with nitrogen, is heated at 75°—80° C. for six hours. There results a solution of copolymer of high molecular size, from which fibers can be formed. These are reactive with basic dyes. They can be treated with reactive amino compounds such as 2-N,N-dimethylaminoethylamine and then heated to increase greatly their affinity to dyes.

A similar fiber-forming copolymer can be made from a 5:95 mixture of ethyleneureidoisobutyl vinyl ether and acrylonitrile.

While N,N-ethyleneureidoalkyl vinyl ethers have been shown above with an alkylene group of only two carbon atoms, there may be formed compounds of the same type in which one or both carbon atoms of the ethylene chain carry other than hydrogen atoms. For example, such substituted ethyleneimino groups may be used as 2,2 - dimethylethyleneimine or 2,3 - dimethylethyleneimine. The monomers resulting are less reactive at the ethyleneurea end. They are of value, however, where high temperatures cures are required, such materials remaining uncross-linked over a considerable range of temperature, but finally reacting.

As an example of how the polymers and copolymers of this invention may be used in the coatings art, there is here cited an example in which N,N-ethyleneureidoisobutyl vinyl ether is combined with a polyester resin. One part of this ether is mixed with four parts of an adipic acid-propylene glycol condensate with an acid number of 40. Such polyesters with acid numbers from 20 to 50 are effectively employed for this purpose. The mixture is catalyzed with 1% of para-toluenesulfonic acid and taken up in a pad of glass fibers. The pad is pressed at 30 lbs. between smooth platens and heated for 20 minutes at 150° C. Tough, translucent sheets with high impact and tensile strength are thus obtained.

A distinctive property of the monomers of this invention is their capacity to form high polymers under the catalytic action of such free radical catalysts as the azo polymerization catalysts. They, thus, are surprisingly different from vinyl alkyl ethers which require acids as polymerization catalysts and are not effectively polymerized with free radical catalysts.

Formation of polymers and copolymers from the ethyleneureidoalkyl vinyl ethers of this invention permits incorporation into high polymers of the reactive ethyleneimino group. This group can be utilized therein to recast with the functional groups in cellulose fibers or films and in amino-containing substances such as wool. Thus cellulose, wool, and the like can be modified in their chemical properties. Yet the physical properties, such as handle, which are desired, can be essentially retained.

Ethyleneureidoalkyl vinyl ethers exhibit insecticidal action, serving as contact insecticides against scale, for example. They may thus be used in spray oils. Some of these ethers, such as ethyleneureidoisobutyl vinyl ether act as plant growth regulants.

I claim:

1. A compound of the formula

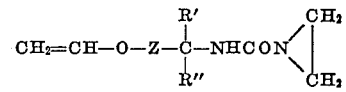

wherein Z is an alkylene group of not over seven carbon atoms; when Z is an alkylene chain of not over two carbon atoms, R' and R" are alkyl groups of not over four carbon atoms; and when Z is an alkylene chain of three to seven carbon atoms, R' and R" are members of the class consisting of hydrogen and alkyl groups of not over four carbon atoms.

2. A polymer of a compound of claim 1.
3. A copolymer of a compound of claim 1 and another copolymerizable monovinylidene compound.
4. A compound of the formula

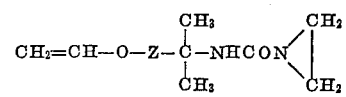

wherein Z is an alkylene group of not over seven carbon atoms.

5. A polymer of a compound of claim 4.
6. The compound of the formula

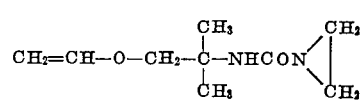

7. A polymer of N,N-ethyleneureidoalkyl vinyl ether.
8. A copolymer of N,N-ethyleneureidoalkyl vinyl ether and another copolymerizable vinylidene compound.
9. A process for preparing a N,N-ethyleneureidoalkyl vinyl ether which comprises reacting together ethyleneimine and a compound of the formula

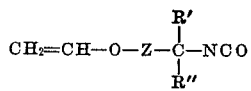

wherein Z is an alkylene group of not over seven carbon atoms; when Z is an alkylene chain of not over two carbon atoms, R' and R" are alkyl groups of not over four carbon atoms; and when Z is an alkylene chain of three to seven carbon atoms, R' and R" are members of the class consisting of hydrogen and alkyl groups of not over four carbon atoms.

10. A process for preparing N,N-ethyleneureidoisobutyl vinyl ether which comprises reacting together ethyleneimine and isocyanatoisobutyl vinyl ether.

References Cited in the file of this patent

UNITED STATES PATENTS

| Number | Name | Date |
|---|---|---|
| 2,242,490 | Ulrich et al. | May 20, 1941 |